March 3, 1970   D. D. DALRYMPLE   3,498,117
REBOUNDING HAMMER TYPE HARDNESS GAUGE
Filed Aug. 18, 1967   4 Sheets-Sheet 1

INVENTOR
Donald D. Dalrymple
By Pierce, Schiffler & Parker
ATTORNEYS

INVENTOR
Donald D. Dalrymple

By Pierre Scheffler & Parker
ATTORNEYS

March 3, 1970  D. D. DALRYMPLE  3,498,117
REBOUNDING HAMMER TYPE HARDNESS GAUGE
Filed Aug. 18, 1967  4 Sheets-Sheet 4

INVENTOR
Donald D. Dalrymple

BY Pierce, Scheffler & Parker
ATTORNEYS

United States Patent Office 3,498,117
Patented Mar. 3, 1970

3,498,117
REBOUNDING HAMMER TYPE
HARDNESS GAUGE
Donald D. Dalrymple, North Warren, Pa., assignor to National Forge Company, Irvine, Pa., a corporation of Delaware
Filed Aug. 18, 1967, Ser. No. 661,715
Int. Cl. G01n 3/52
U.S. Cl. 73—79                                    6 Claims

ABSTRACT OF THE DISCLOSURE

A hardness gauge of the rebounding hammer type particularly suited for use in determining the hardness of surfaces at generally inaccessible locations such as the interior surface of a pipe mould or other tubing comprises a sled type of support for the gauge adapted to be pulled through the tubing. The gauge mechanism on the support includes a motor driven hammer which is arranged to be raised for a predetermined distance above the surface being tested and then dropped. The amplitude of the hammer rebound is determined by an electrical translation device such as a potentiometer or differential transformer mechanically coupled to the hammer, and the response of the translation device is fed over a cable to the exterior of the tubing and thence to an electrical recorder which charts the amplitude of the hammer rebounds.

---

The present invention relates to an improved gauge for determining the hardness of metallic parts under the scleroscope principle wherein hardness is measured as a function of the height to which a falling hammer rebounds after being raised to a predetermined level above the surface to be tested and allowed to fall under the force of gravity.

A principal object of the invention is to provide an improved gauge of the general type described which is particularly well suited for measuring the hardness of surfaces located at rather inaccessible places and hence difficult to reach, such as, for example, the bore of a pipe mould or other tubing where it is desired to take hardness measurements at various locations along the length of the bore.

In general, the improved hardness tester includes a sled type of support which is adapted to be pulled through the bore to a test location and with the hammer out of contact with the bore surface to prevent scratching of the bore surface and wear of the ball contact member of the hammer structure. An electric motor on the sled serves to elevate the hammer to a predetermined height from which it is dropped, and an electrical translating element such as, for example, a slider arm of a potentiometer, or a linearly displaceable core element in the bore of differentially wound coils of a linear transducer is coupled directly to the hammer mechanism so that the mechanical displacement of the electrical translating element becomes a direct measure of the height of hammer rebound. Hammer rebound is thus translated into a proportional electrical quantity and is utilized in conjunction with conventional amplifier-recorder equipment to provide a visual readout of the hammer rebounds from which the peak is ascertained and converted into hardness values.

Means are also provided for adjusting the height of the hammer mechanism with respect to the surface to be tested to accommodate changes in bore diameter with the result that the hammer is always raised to the same height above the surface before being released.

Figure 1:
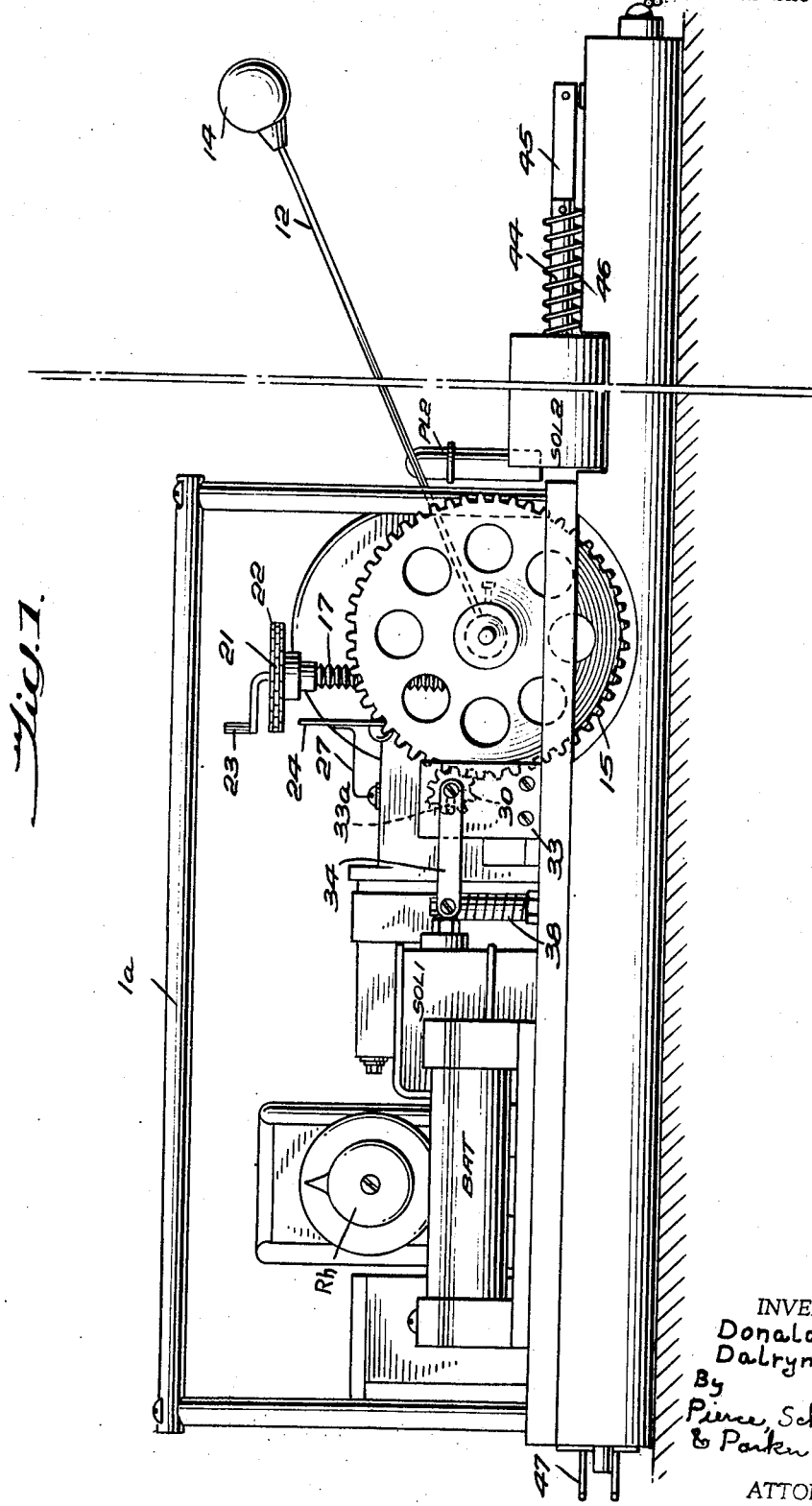
Figure 2:
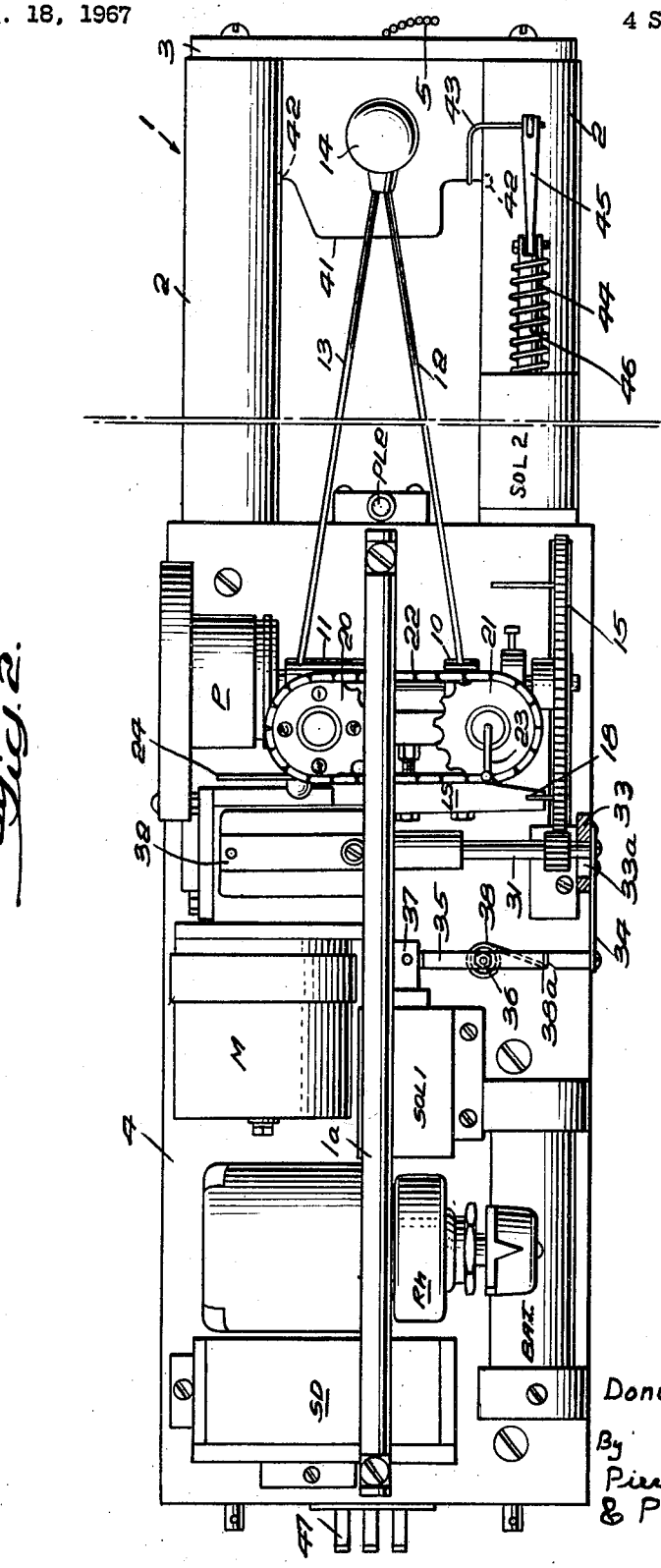
Figure 3:
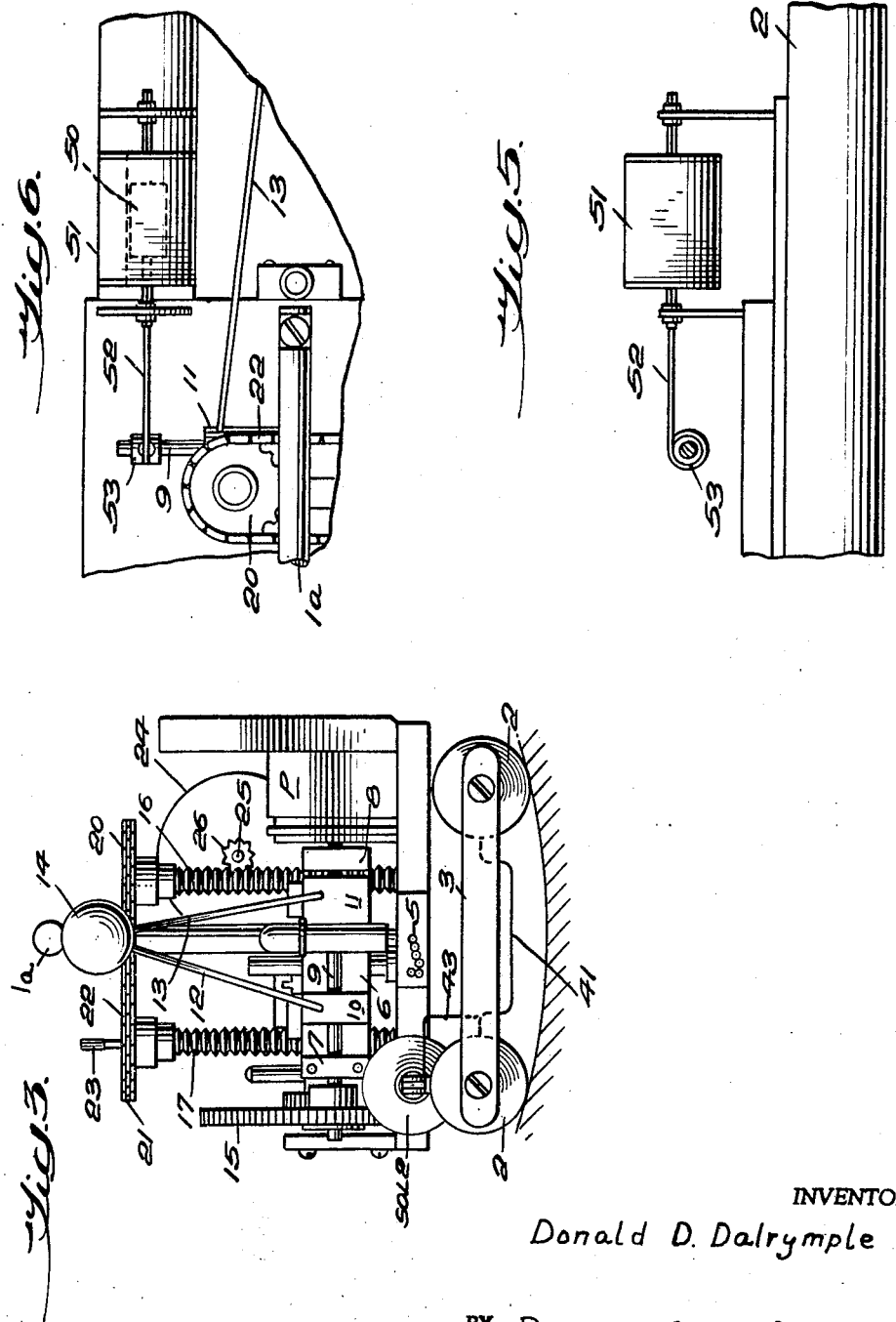
Figure 4:
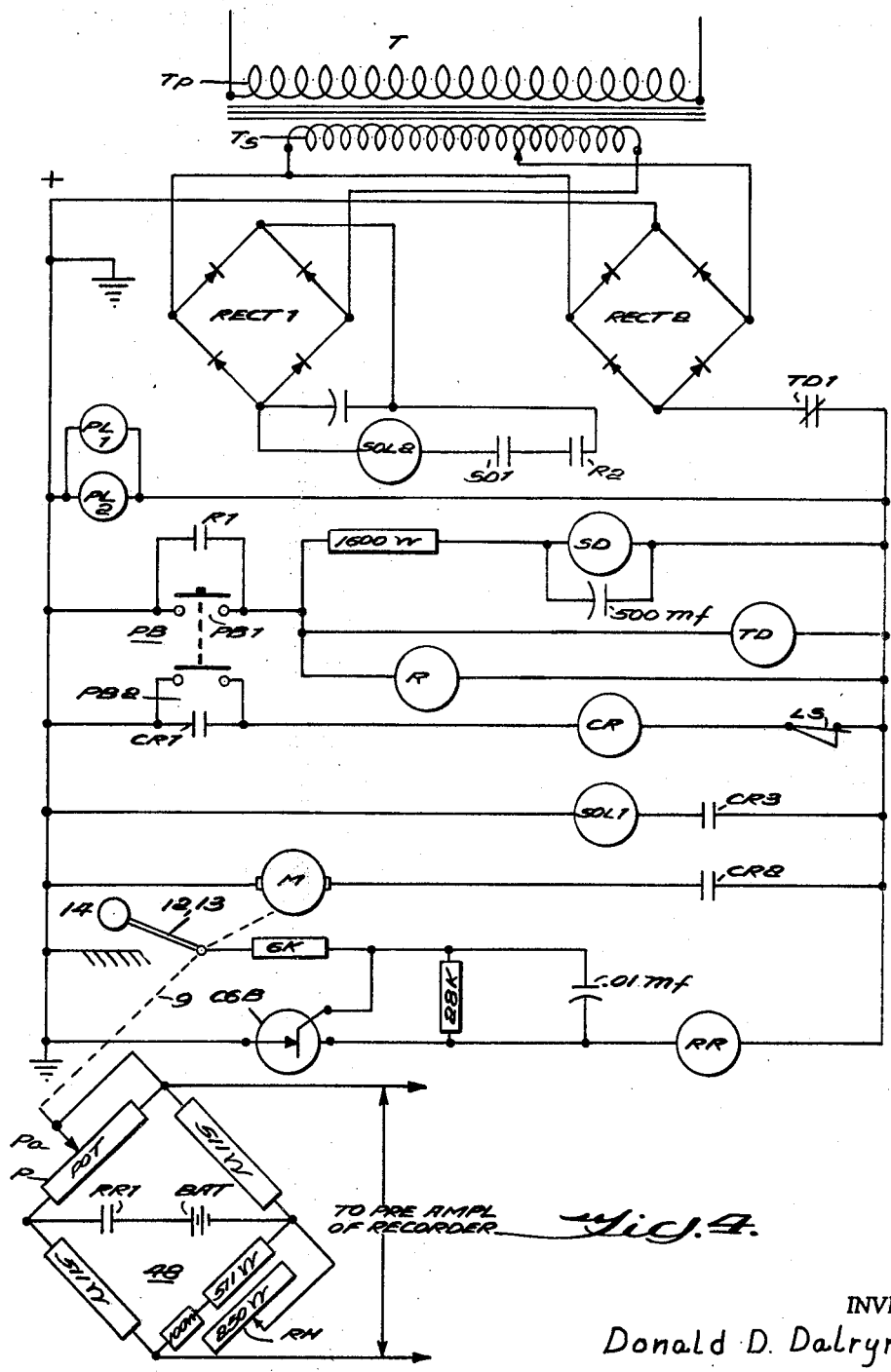

The foregoing as well as other objects and advantages inherent in the invention will become more apparent from the following description of one suitable embodiment and the accompanying drawings wherein:

FIG. 1 is a view of the improved hardness testing instrument in side elevation;
FIG. 2 is a view of the instrument in top plan;
FIG. 3 is a view of the instrument in front end elevation;
FIG. 4 is a schematic electrical diagram of the electrical components utilized and the control circuits;
FIG. 5 is a fragmentary view in side elevation showing a modified arrangement for the electrical translation component of the instrument; and
FIG. 6 is view in top plan of the structure shown in FIG. 5.

With reference now to the drawings and to FIGS. 1–4 in particular, the operating mechanism for the ball hammer is seen to be mounted on a sled type of support 1 which is constituted by two parallel spaced cylindrical runners 2 made of any suitable rigid material such as brass secured together by transverse front bridging member 3 and a base plate 4. A bead type of chain 5 is connected to the front end of the sled 1 to enable it to be drawn through the bore of a pipe mould or other tubing, the interior surface of which is desired to be tested for hardness. The sled also includes a carrying handle 1a.

Arranged transversely upon base plate 4 is a horizontal bar 6 on which are located a pair of spaced bearing sleeves 7, 8 which carry a transverse shaft 9. Located on shaft 9 between the bearing sleeves are a pair of spaced collars 10, 11, these collars being secured to the shaft so as to rotate with it. Extending forwardly of collars 10, 11 are converging rod type arms 12, 13 which terminate in a front structure supporting the ball 14 of the hammer.

At the outer side of bearing sleeve 7, a gear wheel 15 is attached to shaft 9 and serves as a drive gear for this shaft. At the outer side of the other bearing sleeve 8, a potentiometer unit P is mounted on bar 6, this unit having a rotatable slide wire arm Pa, see FIG. 4, coupled to shaft 9 for rotation therewith.

Since it is essential that the hammer always be permitted to fall the same distance regardless of the curvature of the bore of the tubing being tested, an elevating adjustment is provided. This elevating mechanism comprises a pair of spaced screw columns 16, 17 which are free to turn in recesses provided in base plate 4, the lower ends of the columns contacting the bottoms of these recesses, but which run in female threaded bores in bar 6. Thus, as screw columns 16, 17 are rotated, bar 6 and hence all components carried by it, including shaft 9, and the rear support end of the hammer structure (10–14) will be raised or lowered, depending upon the direction of rotation of the screw columns. To rotate the screw columns, a sprocket and chain type of drive is utilized, there being sprocket wheels 20, 21 secured respectively to the upper ends of screw columns 16, 17 and a sprocket chain 22. A crank 23 is secured to sprocket wheel 21 to facilitate manual rotation.

To determine the proper height setting for the hammer mechanism for each bore size, a vertical disc 24 is mounted for rotation on a horizontal shaft 25 which is driven by a pinion gear 26 meshed with the thread on screw column 16. Disc 24 is provided with a calibrated scale for various bore diameters of tubing in which the gauge is to be used, such as, for example, from a minimum of 4.5 inches diameter to a flat surface. The scale on disc 24 is viewed at the position of a pointer 27. For vernier type adjustment, the top surface of sprocket wheel 20 is utilized, this surface being provided with a scale (1, 2, 3, 4) as shown in FIG. 2.

The drive for gear wheel 15 is a pinion 30 mounted on a flexible drive shaft 31 constituting the output from a gear reduction unit 32 powered by electric motor M.

The outer end of shaft 31 is received in a slotted bearing area 33a in a support plate 33, and the shaft end is connected to a link 34 articulated to one end of lever 35 which is pivotally mounted at 36 intermediate its ends. The other end of lever 35 is articulated to the plunger element 37 of a solenoid, Sol. 1. A spiral biasing spring 38 mounted about the axis of rotation of lever 35 and having the outer end 38a thereof anchored to lever 35 functions, when solenoid Sol. 1 is de-energized, to rotate the lever in a clockwise direction from the position indicated in FIG. 2 to pull link 34 rearward and hence disengage the drive pinion 30 from its gear wheel 15. When the solenoid is energized, the reverse movement takes place, thus meshing pinion 30 with gear 15. This mechanism thus constitutes one suitable clutching arrangement for connecting and disconnecting the hammer drive shaft 9 with respect to its motorized drive.

To prevent ball 14 from contacting the bore surface while the sled is being pulled through the bore to reach the desired test location, means are provided for maintaining the ball in a slightly elevated position. Such means include a U-shaped wire 41 the ends of which are received in aligned holes 42 in the brass runners 2. A crank arm 43 secured to one end of the wire serves to rotate the wire about an axis established by the aligned receiving holes 42 so as to engage and disengage the same from the hammer arms 12, 13. For actuating crank arm 43 to lower ball 14 into contact with the surface to be tested, a solenoid Sol. 2 is provided, the solenoid being mounted on runner 2 and the plunger element 44 connected to crank arm 43 via an intermediately disposed link 45. A helical biasing spring 46 surrounding plunger 44 serves to actuate crank arm 43 in the opposite sense when the solenoid is de-energized whereupon the wire 41 is rotated in the direction to engage rods 12, 13 and raise ball 14 to its elevated, transporting position.

As previously explained, sled 1 is dragged through the bore of the pipe mould or other tubing to be surface tested for hardness by means of pull chain 5 attached to the front end of the sled. Attached to the rear end of the sled is a plug 47 by which connections are made to a cable which extends rearwardly for electrical connection of these components carried by the sled into the overall control circuit as shown on FIG. 4. These include pilot light PL2, solenoids Sol. 1 and Sol. 2, relays R and CR, motor M and rectifier C6B. In addition, the cable connection carries the output connections from the Wheatstone bridge 48 which includes the potentiometer P in one branch thereof to the recorder element, not illustrated, which records the bounce of the ball 14 as measured by displacement of the slide arm Pa of the potentiometer.

Located at the recorder station are time delay relays SD and TD, relay R, pilot light PL1, rectifiers Rect. 1 and Rect. 2 and push button switch PB.

A rheostat Rh located on the sled is provided to balance bridge 48.

OPERATION

With energization of the primary winding Tp of transformer T from its 115 volt source of power, the secondary winding Ts supplies a voltage of 24 volts to full wave rectifiers Rect. 1 and Rect. 2. Rectifier Rect. 1 supplies at its output terminals a D.C. voltage for controlling operation of solenoid Sol. 2 and rectifier Rect. 2 supplies at its output terminals a second D.C. voltage for powering the motor M for raising ball 14 and the remaining control elements in the circuit.

The instrument is drawn through the bore of the tube to the location where the hardness is desired to be measured. Push button PB is then depressed to initiate an operating cycle. Relay SD is energized but has about a one second built-in time delay established by means of the 1600 ohm resistor and a 500 mf. capacitor. When the relay contacts SD1 close, solenoid Sol. 2 is energized. The displacement of its plunger 44 serves to rotate the U-shaped support wire 41 and lower ball 14 into contact with the bore surface. Thermal time delay relay TD is energized and, after approximately five seconds opens its normally closed contacts TD1 which ends the cycle and resets all of the relays for the next reading. Energization of relay TD also starts and stops the movement of chart paper through the recorder through another set of contacts, not shown, on relay R. Also, with pressing of the push button PB, relays R and CR are energized. Contacts R1 establish a holding circuit in parallel with one set of contacts PB1 of the push button switch PB and contacts CR1 similarly establish a holding circuit in parallel with another set of contacts PB2 on push button switch PB. These holding circuits thus make it unnecessary to manually hold the push button switch closed.

With the closing of contacts CR3, solenoid Sol. 1 is energized which engages pinion 30 and gear 15. Contacts CR2 in the motor circuit simultaneously close thus energizing drive motor M and raising ball 14. At the top of its lift, limit switch LS is tripped by pin 18 on gear wheel 15 thus de-energizing solenoid Sol. 1 whereupon pinion 30 is retracted from gear wheel 15 and ball 14 falls. When the ball strikes the surface of the metal being tested for hardness, the gate terminal of a silicon controlled rectifier C6B is energized through a ground circuit and causes this rectifier to conduct and thereby energize relay RR, the contacts RR1 of which close and apply voltage from battery Bat. across the wheatstone bridge 48 which includes the winding of potentiometer P as one branch thereof. Since slide wire contact arm Pa is rotated by shaft 9 and its displacement is proportional to the height to which ball 14 rises on rebound, the voltage fed to the preamplifier of the recorder which controls the recording pen on the chart paper will also have a predetermined relationship to the ball lift.

Within several seconds, time delay relay contacts TD1 have opened momentarily and the circuit is reset for the next reading to be taken.

The electrical translation device shown in the embodiment illustrated in FIGS. 1–4, is constituted by potentiometer unit P. An alternative arrangement for measuring hammer rebound as shown in FIGS. 5 and 6 utilizes a linar transducer of conventional design with both a D.C. iput and a D.C. output which operates on the principle of linearly displacing a core 50 in the bore of differentially wound coils 51 to produce an electrical output directly proportional to core displacement. Core 50 is secured to a flexible ribbon type strip 52 which is wrapped around a windup pulley 53 secured upon shaft 9. Thus, as shaft 9 is rotated by the rebound action of the hammer, strip 52 is wound around pulley 53 thus displacing core 50 within the bore of coils 51 and producing an electrical readout which is taken to the amplifier-recorder unit over the connecting cable.

In conclusion, it is to be understood that while suitable embodiments of the invention have been described and illustrated as required by the statutes, various changes may be made in the construction and arrangement of component parts without, however, departing from the spirit and scope of the invention as defined in the appended claims.

I claim:
1. In a gauge structure for measuring surface hardness within the bore of a tubular object, the combination comprising a sled type of support adapted to be passed into the bore to a measuring location, a bar disposed transversely on said support, a shaft extending parallel with said bar and mounted for rotation about its axis in bearings carried by said bar, a pair of vertical parallel spaced screw columns threaded through said bar and contacting said support, means for simultaneously rotating said screw columns in one direction or the other thereby to raise or lower said bar and hence also said shaft, a ball hammer secured to said shaft for rotation therewith, drive means on said support for said shaft, means releasing said drive means from said shaft to per- mit said hammer to drop when said shaft has been rotated through a predetermined angle, and electrical translating means on said support for converting angular rotation of said shaft into a corresponding electrical quantity to measure the extent of the hammer rebound.

2. A gauge structure as defined in claim 1 and which further includes scale means including a movable member actuated by said screw columns.

3. In a gauge structure for measuring surface hardness within the bore of a tubular object, the combination comprising a sled type of support adapted to be passed into the bore to a measuring location, a shaft mounted transversely on said support for rotation about a horizontal axis, a ball hammer secured to said shaft for rotation therewith, a rotatable U-shaped support engageable with said hammer rearwardly of the ball thereon, spring means normally biasing said U-shaped support to a position engaging and lifting said hammer slightly from the bore surface, a solenoid which when energized over-rides said biasing spring means thereby to lower said hammer into contact with the bore surface, drive means on said support for said shaft, means releasing said drive means from said shaft to permit said hammer to drop when said shaft has been rotated through a predetermined angle, and electrical translating means on said support for converting angular rotation of said shaft into a corresponding electrical quantity to measure the extent of the hammer rebound.

4. In a gauge structure for measuring surface hardness within the bore of a tubular object, the combination comprising a sled type of support adapted to be passed into the bore to a measuring location, a shaft mounted transversely on said support for rotation about a horizontal axis, a ball hammer secured to said shaft for rotation therewith, drive means on said support for said shaft, said drive means including an electric motor, a drive pinion rotated by said motor, a gear wheel on said drive shaft and clutch means meshing said drive pinion with said gear wheel, means for releasing said clutch means when said shaft has been rotated through a predetermined angle thereby to release said drive pinion from said gear wheel and permit said hammer to drop, and electrical translating means on said support for converting angular rotation of said shaft upon rebound into a corresponding electrical quantity thereby to measure the extent of the hammer rebound.

5. A gauge structure as defined in claim 4 wherein said clutch means and the release means therefor include spring biasing means normally disengaging said drive pinion from said gear wheel and a solenoid which when energized over-rides said spring biasing means thereby to mesh said drive pinion with said gear wheel.

6. In a gauge structure for measuring surface hardness within the bore of a tubular object, the combination comprising a sled type of support including a pair of spaced runners adapted to be passed into the bore to a measuring location, a horizontal transversely extending bar on said support including shaft bearings, a shaft supported in said bearings for rotation about its axis, a ball hammer secured to said shaft between said runners, a pair of vertical parallel spaced screw columns threaded through said bar and contacting said support, means for simultaneously rotating said screw columns to raise or lower said bar and hence also said shaft and hammer in dependence upon the sense of rotation, scale means correlated to and actuated by said screw column, a U-shaped support engageable with said hammer rear of the ball, spring means normally biasing said U-shaped support to a position engaging and lifting said hammer slightly from the bore surface, a first solenoid on said support which when energized over-rides said spring biasing means thereby to lower said hammer into contact with the bore surface, an electric motor drive for said shaft, said drive including a pinion rotated by said motor, clutching means for meshing said pinion with a gear wheel on said shaft, said clutching means including a second spring biasing means normally disengaging said pinion from said gear wheel and a second solenoid which when energized over-rides said second spring biasing means thereby to mesh said pinion with said gear wheel, said second solenoid being de-energized after a predetermined period of energization thereby to release said shaft after a predetermined rotation thereof and permit said hammer to drop, and electrical translating means coupled to said shaft for converting the reverse rotation of said shaft caused by hammer rebound after striking said bore surface into a corresponding electrical quantity.

References Cited

UNITED STATES PATENTS

| 2,992,554 | 7/1961 | Stolk et al. | 73—79 |
| 3,000,205 | 9/1961 | Süderow | 73—46 |
| 3,067,605 | 12/1962 | Bliss | 73—79 |
| 3,083,564 | 4/1963 | Carter | 73—12 |
| 3,272,000 | 9/1966 | Stebbins | 73—71.5 |

CHARLES A. RUEHL, Primary Examiner

ELLIS J. KOCH, Assistant Examiner

U.S. Cl. X.R.

73—12